Figure 1:
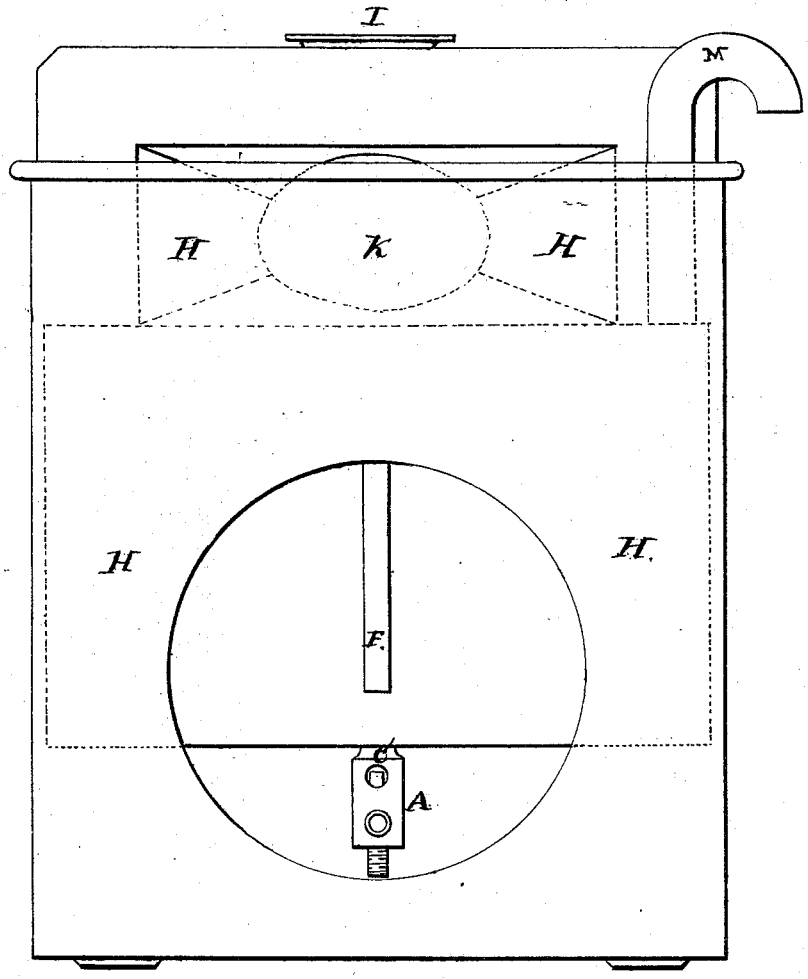
Figure 2:
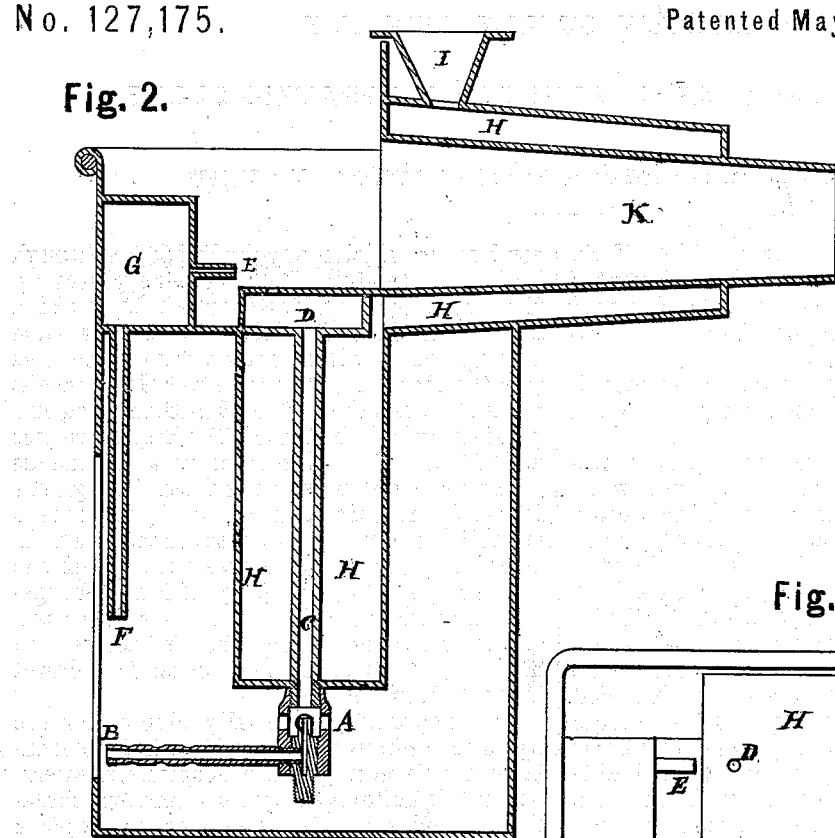
Figure 3:
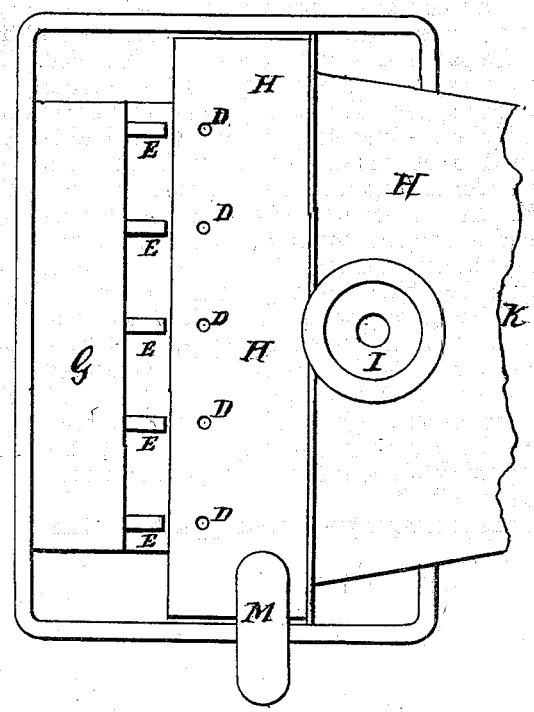

2 Sheets--Sheet 2.

O. LOEW.
Improvement in Apparatus for Generating Ozone.
No. 127,175. Patented May 28, 1872.

WITNESSES.
Edward Rendud
Geo W Greenwood

INVENTOR.
Oscar Loew
pr
A. R. Roessler
atty 127,175

UNITED STATES PATENT OFFICE.

OSCAR LOEW, OF NEW YORK, N. Y.

IMPROVEMENT IN APPARATUS FOR GENERATING OZONE.

Specification forming part of Letters Patent No. 127,175, dated May 28, 1872.

I, OSCAR LOEW, of the city of New York, county and State of New York, have invented an important Improvement in Apparatus for the Production of Ozone, of which the following is an exact specification:

Ozone is produced by my apparatus according to the principle described in my patent No. 107,071.

My improvement has for its object to produce a larger quantity of ozone and simultaneously a convenient arrangement of the different parts necessary for the production of ozone.

These purposes are fulfilled by the following points: First, the Bunsen burner is cooled along the entire length of the tube carrying the mixture of air and gas. The cooler the mixture is kept, the more ozone will be generated. Second, the ozone, as soon as it is formed, is cooled down in order to prevent any reconversion into common oxygen. The ozone passes the tubular mouth-piece, which is provided with double walls through which cold water is running. The cooler arrangement for the ozone, as well as for the Bunsen burner, is conveniently arranged in one and the same case. Third, the Bunsen burner carries a horizontal tube with small holes, which arrangement enables the flames, being very small, not to fall back; the number of small holes may be replaced by a thin slit. Fourth, the air-chamber is connected immediately with the apparatus and the small tubes connected with it are fitted to meet each plane. The strongly-compressed air strikes the upper third of the flames and produces thus ozone.

In the accompanying drawing, A is the Bunsen burner, which is supplied with gas through horizontal gas-tube B. The heat passes up through tube C to the orifices D D D, at which points the flame is delivered. F is a tube through which air is driven from a bellows into the air-chamber or reservoir G, whence it passes through the orifices E E E, meeting and passing through the flame of the Bunsen burner at D D D. H H H represents a continuous reservoir of water, which is filled through the funnel I, and surrounds and cools the tube C of the Bunsen burner, and also the ozone, which, after being generated, passes out through the delivering mouth-piece K. At M is a discharge-pipe, by means of which the water in the reservoir can be drawn off when it becomes too hot to make room for fresh water introduced through funnel I.

This apparatus is specially adapted for the aging and refining spirituous liquids, for bleaching, for disinfecting mines, hospitals, theaters, and public buildings in general, and for inhalation in medical treatment, in which latter place it will be well to place some caustic lime into said deliverer of ozone, in order to absorb all carbonic acid.

What I claim is—

1. The apparatus for the production of an increased quantity of ozone.

2. The connection and arrangement of air-chambers, burner, cooler, and ozone-deliverer in one and the same apparatus.

OSCAR LOEW.

Witnesses:
JULIUS EDMUND DOTCH,
A. R. ROESSLER.